US009843205B2

(12) United States Patent
Kimura et al.

(10) Patent No.: US 9,843,205 B2
(45) Date of Patent: Dec. 12, 2017

(54) SECONDARY PROTECTION IC, METHOD OF CONTROLLING SECONDARY PROTECTION IC, PROTECTION MODULE, AND BATTERY PACK

(71) Applicants: Daisuke Kimura, Tokyo (JP); Junji Takeshita, Tokyo (JP)

(72) Inventors: Daisuke Kimura, Tokyo (JP); Junji Takeshita, Tokyo (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 184 days.

(21) Appl. No.: 14/557,536

(22) Filed: Dec. 2, 2014

(65) Prior Publication Data

US 2015/0162763 A1 Jun. 11, 2015

(30) Foreign Application Priority Data

Dec. 6, 2013 (JP) .................. 2013-253371

(51) Int. Cl.
*H02J 7/00* (2006.01)

(52) U.S. Cl.
CPC ........... *H02J 7/0031* (2013.01); *H02J 7/0063* (2013.01); *H02J 2007/004* (2013.01); *H02J 2007/0037* (2013.01)

(58) Field of Classification Search
CPC ............. B60H 1/00428; B60L 11/1816; B60L 11/1887; B60L 1/003; B60L 1/02; Y02T 10/70; Y02T 10/7072; Y02T 10/7077; Y02T 90/14; H02J 7/0031; H02J 7/0063; H02J 2007/0037; H02J 2007/004
See application file for complete search history.

(56) References Cited

U.S. PATENT DOCUMENTS

| 2005/0242779 | A1 | 11/2005 | Yoshio |
| 2006/0214705 | A1* | 9/2006 | Ikeuchi ................. H02J 7/0031 327/111 |
| 2011/0267726 | A1 | 11/2011 | Ikeuchi et al. |
| 2011/0273804 | A1* | 11/2011 | Ikeuchi ................. H02J 7/0031 361/63 |

FOREIGN PATENT DOCUMENTS

| JP | 2005-160169 | 6/2005 |
| JP | 2010-187531 | 8/2010 |
| JP | 2010-187532 | 8/2010 |

OTHER PUBLICATIONS

Japanese Office Action for 2013-253371 dated Jun. 13, 2017.

* cited by examiner

*Primary Examiner* — Vuthe Siek
(74) *Attorney, Agent, or Firm* — IPUSA, PLLC

(57) ABSTRACT

A secondary protection IC is connected in parallel with a rechargeable battery and controls the charge and discharge of the rechargeable battery separately from a primary protection IC. The secondary protection IC includes a detection circuit that detects an overcharge or overdischarge of the rechargeable battery, a regulator that stabilizes the voltage of the rechargeable battery and outputs the stabilized voltage to the outside of the rechargeable battery, and a control terminal that controls the regulator with a control signal. Each of the detection circuit and the regulator performs a normal operation or stops operating based on the voltage of the rechargeable battery and the control signal.

8 Claims, 5 Drawing Sheets

SECONDARY PROTECTION IC, METHOD OF CONTROLLING SECONDARY PROTECTION IC, PROTECTION MODULE, AND BATTERY PACK

CROSS-REFERENCE TO RELATED APPLICATION

This application is based upon and claims the benefit of priority of Japanese Patent Application No. 2013-253371, filed on Dec. 6, 2013, the entire contents of which are incorporated herein by reference.

BACKGROUND OF THE INVENTION

1. Field of the Invention

The present invention generally relates to secondary protection integrated circuit (IC)s, methods of controlling a secondary protection IC, protection modules, and battery packs.

2. Description of the Related Art

Techniques to control the charge and discharge of rechargeable batteries using a protection circuit in order to prevent the overcharge and overdischarge of rechargeable batteries installed in digital cameras, portable devices, etc., have been known.

For example, Japanese Laid-Open Patent Application No. 2010-187532 illustrates a battery pack including a rechargeable battery monitoring circuit that detects the charge and discharge state of a rechargeable battery and a protection circuit that protects the rechargeable battery by controlling the ON and OFF of transistors, where the operating states of the circuits are detectable.

FIG. 1 is a diagram illustrating a configuration of a battery pack. Referring to FIG. 1, a microcontroller unit (MCU), a reset circuit (RESET) and a regulator (REG) are provided outside a secondary protection IC, and are individually controlled.

SUMMARY OF THE INVENTION

According to an aspect of the present invention, a secondary protection IC is connected in parallel with a rechargeable battery and controls the charge and discharge of the rechargeable battery separately from a primary protection IC. The secondary protection IC includes a detection circuit that detects an overcharge or overdischarge of the rechargeable battery, a regulator that stabilizes the voltage of the rechargeable battery and outputs the stabilized voltage to the outside of the rechargeable battery, and a control terminal that controls the regulator with a control signal. Each of the detection circuit and the regulator performs a normal operation or stops operating based on the voltage of the rechargeable battery and the control signal.

According to an aspect of the present invention, a method of controlling a secondary protection IC, which includes a detection circuit that detects an overcharge or an overdischarge of a rechargeable battery, a regulator that stabilizes the voltage of the rechargeable battery and outputs the stabilized voltage, and a control terminal to which a control signal to control the regulator is input, and which controls the charge and discharge of the rechargeable battery separately from a primary protection IC, includes determining whether or not the voltage of the rechargeable battery is at or below a predetermined voltage, determining whether the control signal is at a first signal level, and causing each of the detection circuit and the regulator to perform a normal operation or stop operating based on the voltage of the rechargeable battery and the control signal.

According to an aspect of the present invention, a protection module includes the secondary protection IC as set forth above, the primary protection IC that controls the charge and discharge of the rechargeable battery, a fuse circuit that is connected in series to the rechargeable battery and is controlled to conduct or interrupt an electric current based on the output of the secondary protection IC, and a switch circuit that is connected in series to the rechargeable battery and is controlled to conduct or interrupt a charge current and a discharge current based on the output of the primary protection IC.

According to an aspect of the present invention, a battery pack includes the secondary protection IC as set forth above, the rechargeable battery, the primary protection IC that controls the charge and discharge of the rechargeable battery, a fuse circuit that is connected in series to the rechargeable battery and is controlled to conduct or interrupt an electric current based on the output of the secondary protection IC, and a switch circuit that is connected in series to the rechargeable battery and is controlled to conduct or interrupt a charge current and a discharge current based on the output of the primary protection IC.

The object and advantages of the present invention will be realized and attained by means of the elements and combinations particularly pointed out in the claims.

It is to be understood that both the foregoing general description and the following detailed description are exemplary and explanatory and not restrictive of the invention.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

Figure 1:
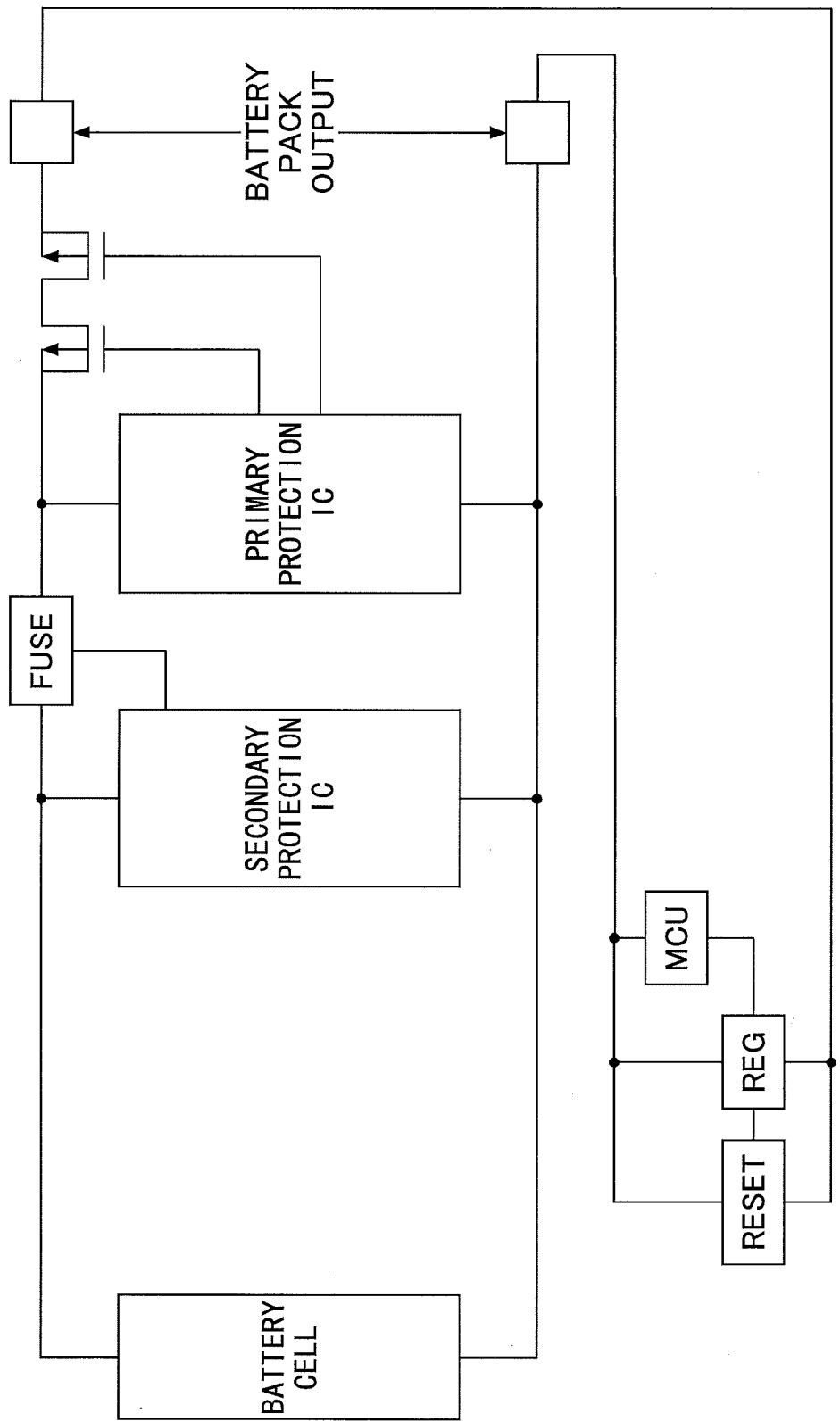
FIG. 1 is a diagram illustrating a configuration of a battery pack.

According to the battery pack illustrated in FIG. 1, multiple circuits are provided outside the secondary protection IC. Therefore, there is a problem in that power consumption increases in proportion to the number of ICs.

Furthermore, there is also a problem in that as the number of ICs increases, the control of each circuit becomes complicated so that the area of the entire circuit increases.

Japanese Laid-Open Patent Application No. 2010-187532 is silent about a technique to externally control the shutdown of a regulator and cause a detection circuit to resume operation after its shutdown.

According to an aspect of the present invention, a secondary protection IC that consumes less power is provided.

A description is given below, with reference to the accompanying drawings, of an embodiment of the present invention. In the drawings, the same elements are referred to by the same reference numeral, and a repetitive description of the elements may be omitted.

Figure 2:
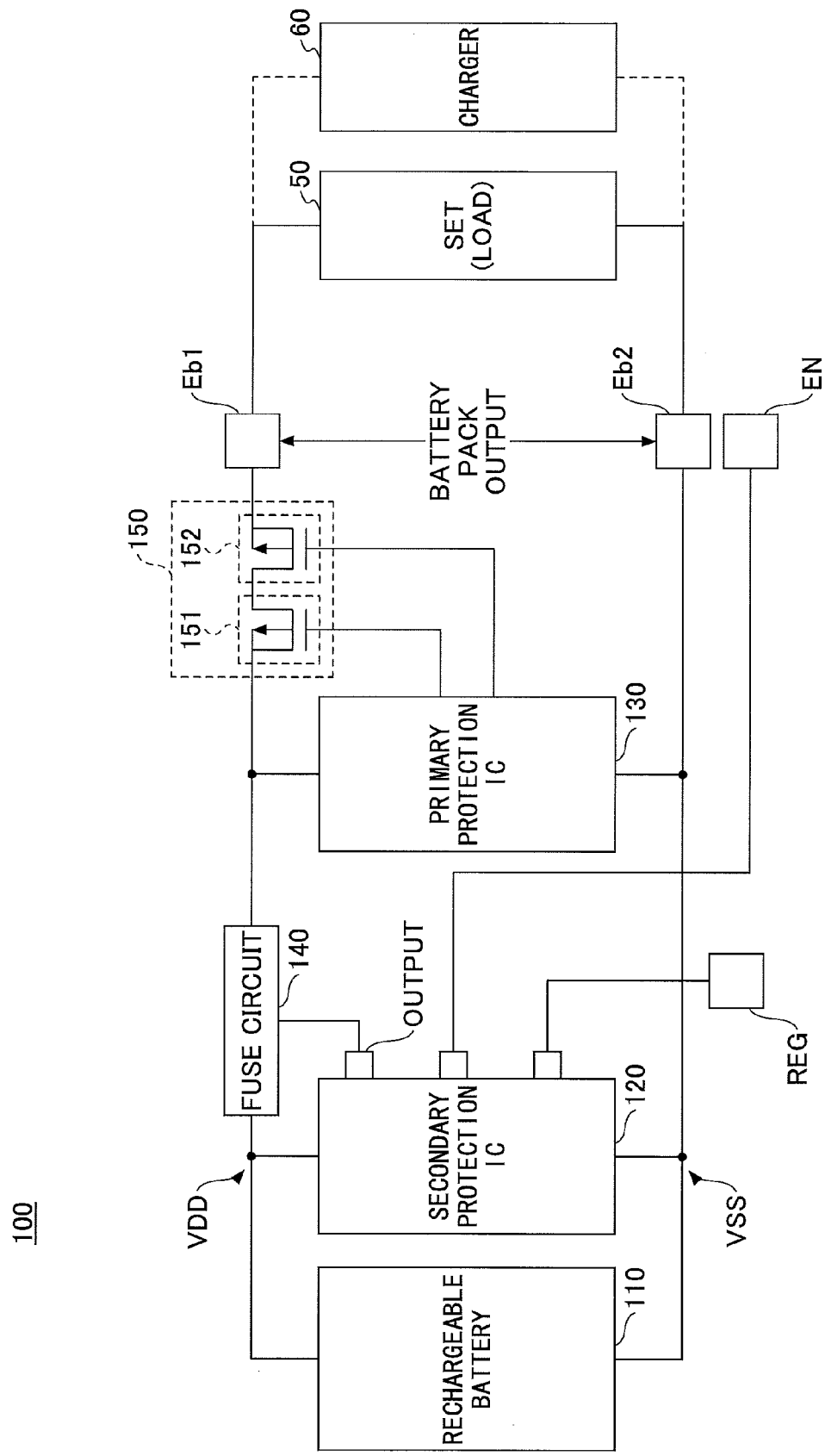
FIG. 2 is a diagram illustrating a configuration a battery pack according to an embodiment.

FIG. 2 is a schematic diagram illustrating a configuration of a battery pack according to the embodiment.

Referring to FIG. 2, a battery pack 100 includes a rechargeable battery 110, a secondary protection IC 120, a primary protection IC 130, a fuse circuit 140, a switch circuit 150, an output terminal OUTPUT, a control terminal EN, an output terminal REG, a positive terminal Eb1, a negative terminal Eb2, a terminal VDD, and a terminal VSS. The configuration of the battery pack 100 except the rechargeable battery 110 is referred to as a protection module.

The rechargeable battery 110 includes multiple unit cells, which are connected in series. The switch circuit 150 includes switching devices 151 and 152. As described in detail below with reference to FIG. 3, the secondary protection IC 120 includes a detection circuit 121 and a regulator 122.

The secondary protection IC 120 and the primary protection IC 130 are connected in parallel with the rechargeable battery 110. The rechargeable battery 110, the fuse circuit 140, and the switch circuit 150 are connected in series.

The terminal VDD (positive terminal) is connected to the positive terminal of the rechargeable battery 110. The terminal VDD and the positive terminal Eb1 are electrically connected via the fuse circuit 140 and the switch circuit 150. The terminal VSS (negative terminal) is connected to the negative terminal of the rechargeable battery 110. The terminal VSS and the negative terminal EB2 are electrically connected.

The detection circuit 121 and the regulator 122 of the secondary protection IC 120 perform normal operations or stop operating (turn on or off) based on a control signal input to the control terminal EN.

An output voltage VREG (FIG. 3) of the regulator 122 of the secondary protection IC 120 is output at the output terminal REG. The output terminal REG is connected to a set (load) 50 outside the battery pack 100.

The rechargeable battery 110 is charged with a charge current supplied from a charger 60 via the positive terminal Eb1 and the negative terminal Eb2. Furthermore, the rechargeable battery 110 supplies a discharge current to the set 50 via the positive terminal Eb1 and the negative terminal Eb2.

The rechargeable battery 110 serves as a power supply (battery) for operating an apparatus such as a digital camera or a portable device. Therefore, the rechargeable battery 110 is protected from overcharge or overdischarge by the control of the secondary protection IC 120 and the primary protection IC 130.

The rechargeable battery 110 is not limited in particular. Examples of the rechargeable battery 110 include energy accumulator-type batteries such as a nickel-metal hydride battery and a lithium-ion battery.

The secondary protection IC 120 protects the rechargeable battery 110 from overcharge when the primary protection IC 130 fails to protect the rechargeable battery 110. Furthermore, the secondary protection IC 120 regulates the voltage of the rechargeable battery 110 and supplies the regulated voltage to the outside of the battery pack 100 as an adjunct function. Specifically, the secondary protection IC 120 reduces the power consumption of a circuit connected external to the battery pack 100 and supplied with voltage from the regulator 122 and the power consumption of an internal circuit of the secondary protection IC 120 by causing the detection circuit 121 and the regulator 122 to perform normal operations or stop operating based on the voltage of the rechargeable battery 110 (the cell voltages of the unit cells) and a control signal input to the control terminal EN.

For example, when the voltage of the rechargeable battery 110 is at or below a predetermined voltage (a threshold voltage Vth) and the control signal input to the control terminal EN is at a first signal level (for example, LOW level), the detection circuit 121 and the regulator 122 stop operating (shut down). On the other hand, when the control signal input to the control terminal EN is at a second signal level (for example, HIGH level), the detection circuit 121 and the regulator 122 perform normal operations irrespective of the voltage of the rechargeable battery 110. The first signal level and the second signal level are different.

The secondary protection IC 120 includes the control terminal EN, and the detection circuit 121 and the regulator 122 are provided inside the secondary protection IC 120. Accordingly, it is possible for the secondary protection IC 120 to detect the voltage of the rechargeable battery 110 and control the charge and discharge of the rechargeable battery 110. By reducing the number of ICs by integrating circuits (such as a detection circuit and a regulator) into a single chip, it is possible to realize the secondary protection IC 120 that is reduced in power consumption.

The primary protection IC 130 outputs control signals to control the ON and OFF of the switching devices 151 and 152 included in the switch circuit 150. The configuration of the primary protection circuit (the primary protection IC 130 and the switch circuit 150) is not limited in particular. A protection circuit standardized as a common protection circuit may be applied to the configuration of the primary protection circuit.

The primary protection IC 130 includes a switch control circuit that controls the switch circuit 150, a current detection circuit that detects electric current, a voltage detection circuit that detects voltage, an overcharge detection circuit, an overdischarge detection circuit, a current monitoring circuit, a voltage monitoring circuit, and a notification processing circuit.

The primary protection IC 130 may further include a detection circuit and a regulator corresponding to the detection circuit 121 and the regulator 122, respectively, of the secondary protection IC 120.

The fuse circuit 140 is controlled by the secondary protection IC 120. The fuse circuit 140 interrupts or conducts an electric current flowing through the fuse circuit 140 based on the output signal of the output terminal OUTPUT of the secondary protection IC 120.

With the fuse circuit 140, it is possible to properly protect the rechargeable battery 110 from an overcurrent and a sudden temperature increase.

The fuse circuit 140 may be replaced by a circuit that includes any element having a switching function, such as a relay circuit, a capacitor, a transistor or a switching device. The fuse circuit 140 may include a heater resistor that enables precise measurement of temperature.

The switch circuit 150 controls a charge current or a discharge current based on a control signal output from the primary protection IC 130. For example, field-effect transistor (FET)s may be used as the switching devices 151 and 152. The switch circuit 150 is not limited in particular to a configuration including a pair of switching devices.

The ON and OFF of the switching device 151 is controlled based on a control signal output from the primary protection IC 130, so that the interruption or conduction of a discharge current is controlled. When the switching device 151 is OFF, the discharge current is interrupted, and when the switching device 151 is ON, the discharge current is conducted.

The ON and OFF of the switching device 152 is controlled based on a control signal output from the primary protection IC 130, so that the interruption or conduction of a charge current is controlled. When the switching device 152 is OFF, the charge current is interrupted, and when the switching device 152 is ON, the charge current is conducted.

For example, at the time of charging the battery pack 100, the charger 60 is connected to the positive terminal Eb1 and the negative terminal Eb2, and the primary protection IC 130 controls the switch circuit 150 so that the switching device 152 is turned ON. As a result, it is possible to supply the battery pack 100 with electric power. On the other hand, at the time of discharging the battery pack 100, the set 50 is connected to the positive terminal Eb1 and the negative terminal Eb2, and the primary protection IC 130 controls the switch circuit 150 so that the switching device 151 is turned ON. As a result, it is possible to supply the set 50 with electric power.

In the above description, an FET is noted as an example of a switching device. The switching devices 151 and 152, however, are not limited in particular, and may be any semiconductor devices that turn on and off. For example, the switching devices 151 and 152 may be power semiconductor devices controlled by voltage through an insulated gate, such as IGBTs or MOSFETs, or bipolar transistors. In this embodiment, a description is given of the case where a pair of PMOS transistors is employed as the switching devices 151 and 152. Alternatively, the pair of PMOS transistors may be replaced with a pair of NMOS transistors.

According to the above-described battery pack 100, it is possible for the secondary protection IC 120 to stop the operations of the detection circuit 121 and the regulator 122 and switch the detection circuit 121 and the regulator 122 to a shutdown mode (a low power consumption mode) before the rechargeable battery 110 is overdischarged. Therefore, it is possible to save the electric power of the battery pack 100 while reducing the current consumption of the secondary protection IC 120. Furthermore, by reducing the number of ICs, it is possible to reduce the area of the entire circuit and reduce the space of the battery pack 100.

Figure 3:
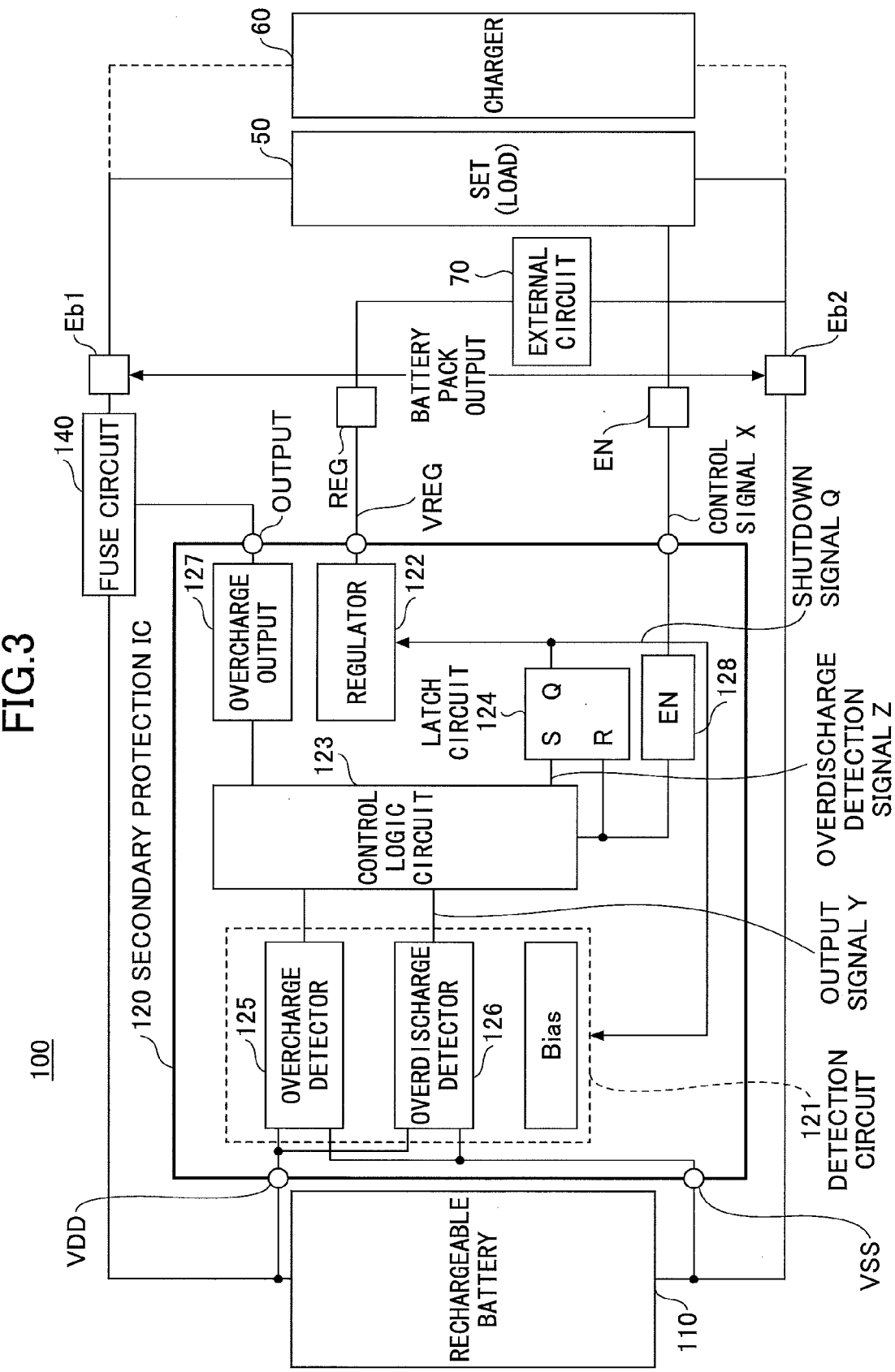
FIG. 3 is a diagram illustrating a configuration of a secondary protection IC according to the embodiment.

FIG. 3 is a block diagram schematically illustrating a configuration of the secondary protection IC 120 according to this embodiment. In FIG. 3, the secondary protection IC 120 is surrounded by a bold line, and configurations other than the secondary protection IC 120 also are illustrated for convenience.

Referring to FIG. 3, the secondary protection IC 120 includes the detection circuit 121, the regulator 122, a control logic circuit 123, a latch circuit 124, an overcharge output 127, and an EN block 128.

The detection circuit 121 includes an overcharge detector 125 and an overdischarge detector 126, and detects an overcharge and overdischarge of the battery pack 100.

The overdischarge detector 126 outputs an output signal Y. A signal waveform of the output signal Y is illustrated in (e) of FIG. 4. The control logic circuit 123 outputs an overdischarge detection signal Z. A signal waveform of the overdischarge detection signal Z is illustrated in (f) of FIG. 4. The latch circuit 124 outputs a shutdown signal Q. A signal waveform of the shutdown signal Q is illustrated in (g) of FIG. 4. The shutdown signal Q is a signal to shut down the detection circuit 121 and the regulator 122.

The rechargeable battery 110 illustrated in FIG. 3 may be composed of, for example, four unit cells connected in series. The number of unit cells of the rechargeable battery 110 is not limited in particular.

The overcharge detector 125 detects an overcharge of the rechargeable battery 110 when the cell voltage of a unit cell becomes higher than or equal to an overcharge detection voltage (for example, 4.3 V).

When the overcharge detector 125 detects the overcharge, the level of the output signal of the output terminal OUTPUT becomes HIGH, so that the fuse circuit 140 melts a fuse. As a result, the overcharge detector 125 stops charging of the rechargeable battery 110.

The overdischarge detector 126 detects an overdischarge of the rechargeable battery 110 when the cell voltage of a unit cell becomes lower than or equal to an overdischarge detection voltage (for example, 2.8 V).

When the overdischarge detector 126 detects the overdischarge, the detection result is input to the control logic circuit 123, so that the control logic circuit 123 outputs the discharge detection signal Z to the latch circuit 123 based on the input signal. The latch circuit 124 outputs the shutdown signal Q, which is a latched signal indicating an overdischarge state. When the shutdown signal Q is input to each of the detection circuit 121 and the regulator 122 (that is, when the level of the shutdown signal Q becomes HIGH), the detection circuit 121 and the regulator 122 stop operating and enter a shutdown mode. As a result, the overdischarge detector 126 stops discharge of the rechargeable battery 110. On the other hand, the detection circuit 121 and the regulator 122 perform normal operations when the shutdown signal Q is not input to the detection circuit 121 and the regulator 122 (that is, when the level of the shutdown signal Q is LOW).

The configuration of the overcharge detector 125 and the configuration of the overdischarge detector 126 are not limited in particular.

The regulator 122 stabilizes the voltage of the rechargeable battery 110, and outputs the stabilized voltage from the output terminal REG as an output voltage VREG. The output voltage VREG is input to an external circuit 70 such as an MCU and a real-time clock (RTC).

For example, when the level of a control signal X input to the control terminal EN becomes LOW (0.5 V or lower) and the cell voltage of a unit cell becomes lower than or equal to 2.75 V while the output voltage VREG at the output terminal REG is 3.3 V, the output voltage VREG at the output terminal REG becomes OFF. On the other hand, when the level of the control signal X of the control terminal EN is HIGH (at or above 2.5 V), the output voltage VREG at the output terminal REG does not become OFF even when the cell voltage becomes lower than or equal to 2.75 V.

The control logic circuit 123 inputs appropriate signals to an input terminal S and an input terminal R of the latch circuit 124 based on the control signal X of the control terminal EN and the output signal Y of the detection circuit 121. For example, the control logic circuit 123 inputs the overdischarge detection signal Z to the input terminal S of the latch circuit 124.

The latch circuit 124 includes the input terminal S, the input terminal R, and an output terminal Q. The overdischarge detection signal Z is input to the input terminal S. Signals such as the control signal X of the control terminal EN are input to the input terminal R. The shutdown signal Q is output from the output terminal Q.

For example, when the high-level shutdown signal Q is input to the detection circuit 121 and the regulator 122 from the output terminal Q of the latch circuit 124, the detection circuit 121 and the regulator 122 stop operating. Furthermore, for example, when the low-level shutdown signal Q is input to the detection circuit 121 and the regulator 122 from the output terminal Q of the latch circuit 124, the detection circuit 121 and the regulator 122 perform normal operations.

That is, the detection circuit 121 and the regulator 122 are controlled by the shutdown signal Q output from the output terminal Q of the latch circuit 124 so as to perform normal operations or stop operating.

As described above, it is possible for the secondary protection IC 120 according to this embodiment to properly control the operations of the detection circuit 121 and the regulator 122 based on the voltage of the rechargeable battery 110 and the control signal X input to the control terminal EN. As a result, it is possible to reduce the power consumption of the battery pack 100 while protecting the battery pack 100 by preventing an overcharge or overdischarge of the rechargeable battery 110.

Figure 4:
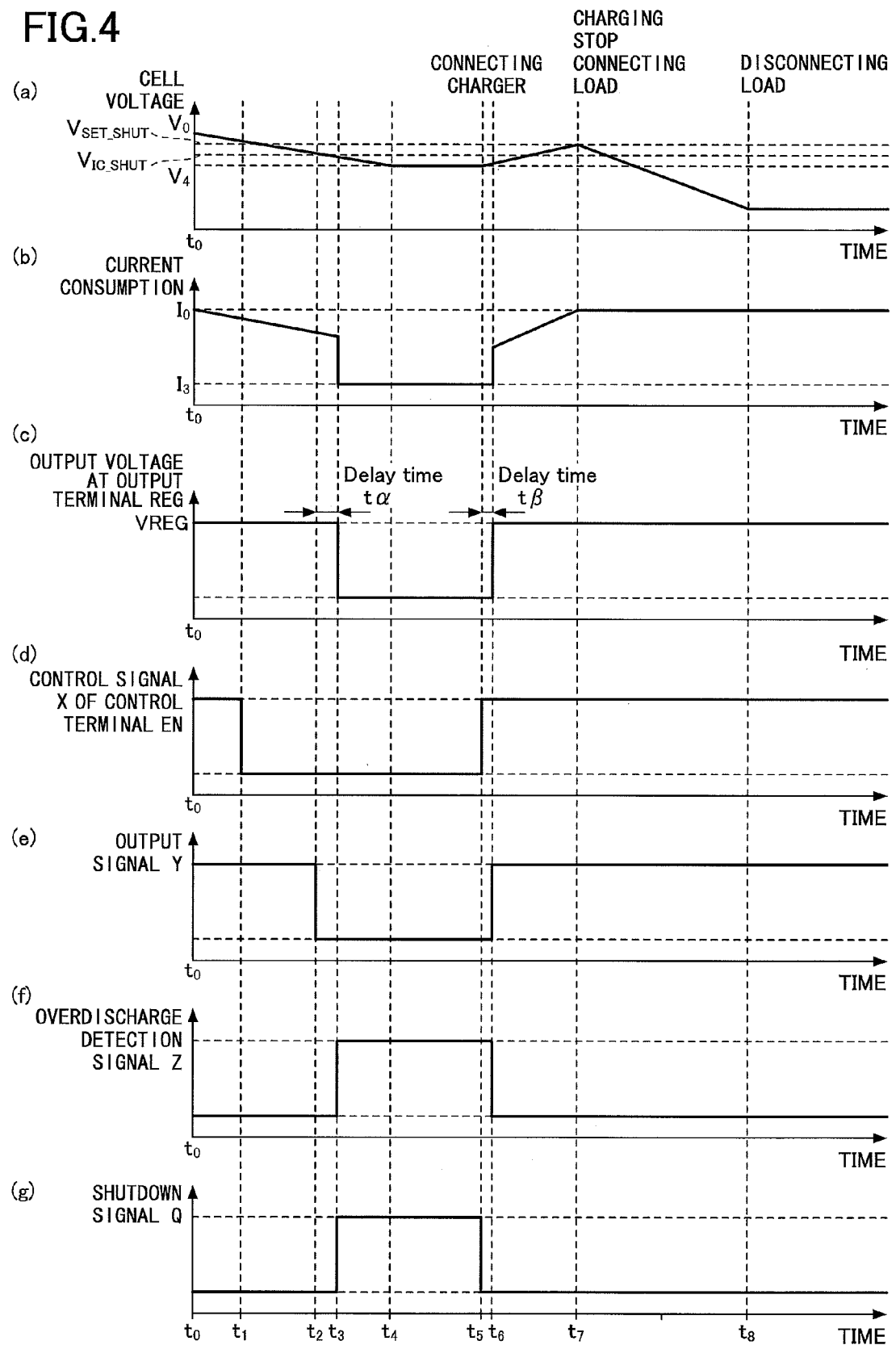
FIG. 4 is a timing chart of the secondary protection IC according to the embodiment.

A description is given, with reference to the timing chart illustrated in FIG. 4, of operations at terminals of the secondary protection IC 120.

In FIG. 4, (a) illustrates the voltage across the rechargeable battery 110 (the voltage between the positive terminal and the negative terminal of the rechargeable battery 110), (b) illustrates the current consumption of the entire secondary protection IC 120, (c) illustrates the output voltage VREG at the output terminal REG, (d) illustrates the control signal X of the control terminal EN, (e) illustrates the output signal Y of the overdischarge detector 126, (f) illustrates the overdischarge detection signal Z of the control logic circuit 123, and (g) illustrates the shutdown signal Q output from the latch circuit 124.

First, at time $t_0$, the cell voltage is $V_0$, the current consumption is $I_0$, the output voltage VREG is ON, the level of the control signal X is HIGH, the level of the output signal Y is HIGH, the level of the overdischarge detection signal Z is LOW, and the level of the shutdown signal Q is LOW.

Next, at time $t_1$, the cell voltage gradually decreases from $V_0$ to become Vset_shut (the threshold voltage Vth). The current consumption gradually decreases from $I_0$. The output voltage VREG remains ON. At the same time that the cell voltage becomes Vset_shut, the level of the control signal X switched from HIGH to LOW. The control signal X at time $t_1$ is a control signal for switching the detection circuit 121 and the regulator 122 to a standby mode. The level of the output signal Y remains HIGH. The level of the overdischarge detection signal Z and the level of the shutdown signal Q remain LOW.

Next, at time $t_2$, the cell voltage further decreases from Vset_shut to become Vic_shut. The current consumption continues to decrease. The output voltage VREG remains ON. The level of the control signal X remains LOW. The level of the output signal Y switches from HIGH to LOW. The level of the overdischarge detection signal Z and the level of the shutdown signal Q remain LOW.

Next, at time $t_3$, the cell voltage further decreases from Vic_shut. The detection circuit 121 is shut down by the level of the shutdown signal Q becoming HIGH, so that the current consumption suddenly decreases to become $I_3$. The output voltage VREG becomes OFF. The interval between time $t_2$ and time $t_3$ is a delay time tα (for example, 10.0 ms) set inside the secondary protection IC 120. Accordingly, even when the level of the control signal X becomes LOW and the cell voltage becomes lower than or equal to Vset_shut, the level of the output terminal REG does not switch from HIGH to LOW if the level of the control signal X becomes HIGH or the cell voltage becomes higher than a predetermined voltage (at which the level of the output terminal REG becomes LOW) during the delay time tα. The level of the control signal X and the level of the output signal Y remain LOW. The level of the overdischarge detection signal Z and the level of the shutdown signal Q switch from LOW to HIGH. That is, when the cell voltage becomes lower than or equal to the threshold voltage Vth and the level of the output terminal REG switches from HIGH to LOW with the level of the control signal X being LOW, the level of the shutdown signal Q switches from LOW to HIGH, so that the detection circuit 121 and the regulator 122 stop operating.

Next, at time $t_4$, the cell voltage stops decreasing as a result of the shutdown of the detection circuit 121 and the regulator 122 to become $V_4$. The current consumption remains $I_3$. The level of the output voltage VREG, the level of the control signal X, and the level of the output signal Y remain LOW. The level of the overdischarge detection signal Z and the level of the shutdown signal Q remain HIGH.

Next, at time $t_5$, the cell voltage gradually increases from $V_4$. The current consumption remains $I_3$. The level of the output voltage VREG remains LOW. The level of the control signal X switches from LOW to HIGH. The control signal X at time $t_5$ is a signal for canceling the standby mode of the detection circuit 121 and the regulator 122. The level of the output signal Y remains LOW. The level of the overdischarge detection signal Z remains HIGH. The level of the shutdown signal Q switches from HIGH to LOW. When the level of the control signal X switches from LOW to HIGH, the level of the shutdown signal Q switches from HIGH to LOW independent of the cell voltage. As a result of the switching of the level of the shutdown signal Q from HIGH to LOW, the standby mode of the detection circuit 121 and the regulator 122 is canceled, so that the detection circuit 121 and the regulator 122 resume normal operations.

Next, at time $t_6$, the cell voltage continues to increase. The current consumption suddenly increases because of the cancellation of the shutdown. The output voltage VREG becomes ON. The interval between time $t_5$ and time $t_6$ is a delay time tβ (for example, 0.5 ms) set inside the secondary protection IC 120. Accordingly, even when the level of the control signal X becomes HIGH before time $t_5$, the level of the output terminal REG does not switch from LOW to HIGH if the level of the control signal X becomes LOW during the delay time tβ. The level of the control signal X remains HIGH. The level of the output signal Y switches from LOW to HIGH. The level of the overdischarge detection signal Z switches from HIGH to LOW.

Next, at time $t_7$, the cell voltage stops increasing because of the stop of charging. The current consumption gradually increases until the stop of charging. The level of the output voltage VREG, the level of the control signal X, and the level of the output signal Y remain HIGH. The level of the overdischarge detection signal Z and the level of the shutdown signal Q remain LOW.

Furthermore, between time $t_7$ and time $t_8$, the cell voltage continues to decrease because of the connection of the set (load) 50. The level of the output voltage VREG, the level of the control signal X, and the level of the output signal Y remain HIGH. The level of the overdischarge detection signal Z and the level of the shutdown signal Q remain LOW.

Next, at time $t_8$, the cell voltage stops decreasing because of the disconnection of the set (load) 50. The level of the output voltage VREG, the level of the control signal X, and the level of the output signal Y remain HIGH. The level of the overdischarge detection signal Z and the level of the shutdown signal Q remain LOW.

As is clear from the timing chart after time $t_8$, when the level of the control signal X of the control terminal EN is HIGH, the level of the shutdown signal Q does not switch from LOW to HIGH even when the cell voltage becomes lower than or equal to the overdischarge detection voltage. Because the high-level control signal X continues to be input to the input terminal R of the latch circuit 124, the detection circuit 121 and the regulator 122 do not stop operating. That is, when the level of the control signal X of the control terminal EN is HIGH, the secondary protection IC 120 causes the detection circuit 121 and the regulator 122 to perform normal operations independent of the cell voltage.

According to the secondary protection IC 120 of this embodiment, by controlling the switching of the detection circuit 121 and the regulator 122 to the shutdown mode, it is possible to control the operations of the detection circuit 121 and the regulator 122 in accordance with conditions on the load side and the state of a supply of power to other ICs. For example, when the charger 60 is connected on the load side, it is possible to prevent the detection circuit 121 and the regulator 122 from switching to the shutdown mode. Furthermore, for example, even when the condition of the control signal X allows switching to the shutdown mode, it is possible to cause the regulator 122 to supply electric power to other ICs while letting the regulator 122 perform normal operations so as to use the rechargeable battery 110 to the limit of its capacity, if the voltage of the rechargeable battery 110 is higher than a predetermined voltage (threshold voltage Vth).

According to the secondary protection IC 120 of this embodiment, the detection circuit 121 and the regulator 122 are caused to perform normal operations or stop operating based on the voltage of the rechargeable battery 110 and the control signal X of the control terminal EN. It is possible to reduce the power consumption of the rechargeable battery 110 by properly switching the detection circuit 121 and the regulator 122 to the shutdown mode in accordance with the conditions of the battery pack 100.

Figure 5:
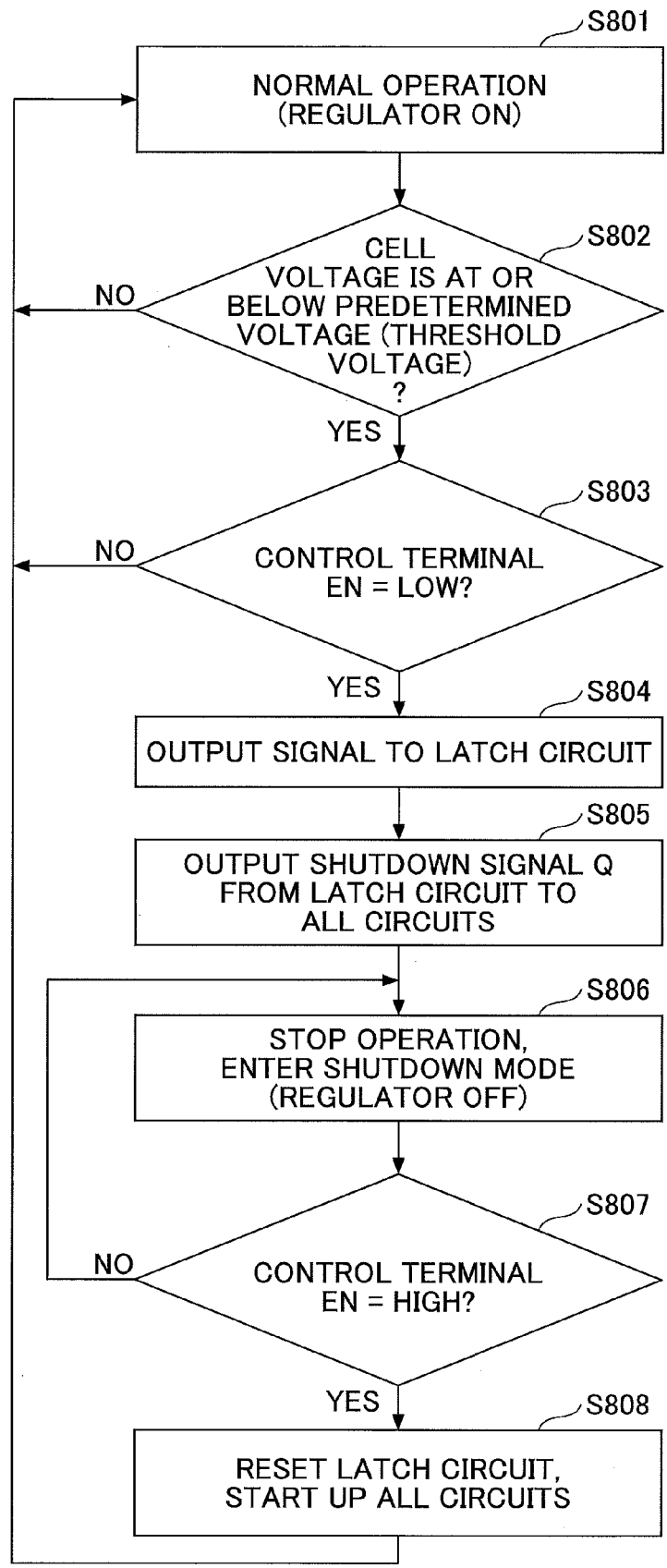
FIG. 5 is a flowchart of a process of the secondary protection IC according to the embodiment.

Next, a description is given, with reference to the flowchart of FIG. 5, of a flow of a process at the time when the secondary protection IC 120 switches from a normal operation to the shutdown mode. FIGS. 3 and 4 also may be referred to in the following description.

At step S801, the detection circuit 121 and the regulator 122 of the secondary protection IC 120 perform normal operations. The high-level control signal X is input to the input terminal R of the latch circuit 124.

At step S802, the secondary protection IC 120 determines whether or not the cell voltage is at or below a predetermined voltage (threshold voltage Vth).

If the secondary protection IC 120 determines that the cell voltage is at or below the threshold voltage Vth (YES at step S802), the process proceeds to step S803. If the secondary protection IC 120 determines that the cell voltage is above the threshold voltage Vth (NO at step S802), the process returns to step S801.

At step S803, the secondary protection IC 120 determines whether the level of the control terminal EN for controlling the regulator 122 is LOW.

If the secondary protection IC 120 determines that the level of the control terminal EN is LOW (YES at step S803), the process proceeds to step S804. If the secondary protection IC 120 determines that the level of the control terminal EN is HIGH (NO at step S803), the process returns to step S801.

At step S804, the control logic circuit 123 outputs signals to the latch circuit 124. For example, the overdischarge detection signal Z is input to the input terminal S of the latch circuit 124, and the control signal X of the control terminal EN is input to the input terminal R of the latch circuit 124.

At step S805, the latch circuit 124 outputs the shutdown signal Q to all circuits (including the detection circuit 121 and the regulator 122).

That is, when the cell voltage becomes lower than or equal to the threshold voltage Vth to cause a shutdown on the set 50 side, the level of the control signal X becomes LOW. The threshold voltage Vth differs depending on the set 50 that is used. In the set 50 for which the secondary protection IC 120 is used, the threshold voltage Vth per unit cell may be approximately 3.0 V. For example, when the rechargeable battery 110 is discharged because of current consumption by the secondary protection IC 120 so that the cell voltage becomes lower than or equal to 2.7 V, the overdischarge detector 126 detects an overdischarge, so that the high-level shutdown signal Q is output.

At step S806, the high-level shutdown signal Q is input to the detection circuit 121 and the regulator 122, so that the detection circuit 121 and the regulator 122 switch to the shutdown mode and stop operating.

At step S807, the secondary protection IC 120 determines whether the level of input to the control terminal EN is HIGH.

If the secondary protection IC 120 determines that the level of input to the control terminal EN is HIGH (YES at step S807), the process proceeds to step S808. If the secondary protection IC 120 determines that the level of input to the control terminal EN is LOW (NO at step S807), the process returns to step S806.

At step S808, the secondary protection IC 120 resets the latch circuit 124, and causes all circuits to start and again perform normal operations. At this point, the high-level control signal X is input to the input terminal R of the latch circuit 124 from the control terminal EN.

When the process of step S808 ends, the secondary protection IC 120 returns to step S801 and starts the process of step S801.

As described above, according to the battery pack 100 of this embodiment, by determining whether to enable the detection circuit 121 and the regulator 122 to switch to the shutdown mode, it is possible to switch the secondary protection IC 120 to a low power consumption mode as desired.

All examples and conditional language provided herein are intended for pedagogical purposes of aiding the reader in understanding the invention and the concepts contributed by the inventors to further the art, and are not to be construed as limitations to such specifically recited examples and conditions, nor does the organization of such examples in the specification relate to a showing of the superiority or inferiority of the invention. A secondary protection IC, a method of controlling a secondary protection IC, a protection module, and a battery pack have been described in detail above based on one or more embodiments of the present invention. It should be understood, however, that the various changes, substitutions, and alterations could be made hereto without departing from the spirit and scope of the invention.

What is claimed is:

1. A secondary protection IC connected in parallel with a rechargeable battery and controlling a charge and discharge of the rechargeable battery separately from a primary protection IC, the secondary protection IC, comprising:
   a detection circuit that detects an overcharge or an overdischarge of the rechargeable battery;

a regulator that stabilizes a voltage of the rechargeable battery and outputs the stabilized voltage to an outside of the rechargeable battery;
a control terminal to which a control signal is input; and
a control circuit that controls a shutdown signal based on at least the control signal, the shutdown signal being a signal to shut down the detection circuit and the regulator,
wherein the detection circuit detects the overdischarge of the rechargeable battery to output an output signal, and
the output signal of the detection circuit and the control signal input to the control terminal are input to the control circuit, and the control circuit outputs the shutdown signal based on the output signal and the control signal input thereto.

2. The secondary protection IC as claimed in claim 1, wherein
the control circuit controls the shutdown signal to cause each of the detection circuit and the regulator to stop operating when the voltage of the rechargeable battery is at or below a predetermined voltage and the control signal is at a first signal level, and
the control circuit controls the shutdown signal to cause each of the detection circuit and the regulator to perform a normal operation when the control signal is at a second signal level, irrespective of the voltage of the rechargeable battery.

3. The secondary protection IC as claimed in claim 2, wherein the control signal switches to the first signal level in response to the voltage of the rechargeable battery decreasing to a threshold voltage that is higher than the predetermined voltage.

4. A protection module, comprising:
the secondary protection IC as set forth in claim 1;
the primary protection IC that controls the charge and discharge of the rechargeable battery;
a fuse circuit connected in series to the rechargeable battery, wherein the fuse circuit is controlled to conduct or interrupt an electric current based on an output of the secondary protection IC; and
a switch circuit connected in series to the rechargeable battery, wherein the switch circuit is controlled to conduct or interrupt a charge current and a discharge current based on an output of the primary protection IC.

5. A battery pack, comprising:
the secondary protection IC as set forth in claim 1;
the rechargeable battery;
the primary protection IC that controls the charge and discharge of the rechargeable battery;
a fuse circuit connected in series to the rechargeable battery, wherein the fuse circuit is controlled to conduct or interrupt an electric current based on an output of the secondary protection IC; and
a switch circuit connected in series to the rechargeable battery, wherein the switch circuit is controlled to conduct or interrupt a charge current and a discharge current based on an output of the primary protection IC.

6. A method of controlling a secondary protection IC, the secondary protection IC including a detection circuit that detects an overcharge or an overdischarge of a rechargeable battery, a regulator that stabilizes a voltage of the rechargeable battery and outputs the stabilized voltage, a control terminal to which a control signal is input, and a control circuit that controls a shutdown signal based on at least the control signal, the shutdown signal being a signal to shut down the detection circuit and the regulator, the secondary protection IC controlling a charge and discharge of the rechargeable battery separately from a primary protection IC, the method comprising:
detecting, by the detection circuit, the overdischarge of the rechargeable battery to output an output signal; and
outputting, by the control circuit, the shutdown signal based on the output signal of the detection circuit and the control signal input to the control terminal in response to the output signal of the detection circuit and the control signal input to the control terminal being input to the control circuit.

7. The method as claimed in claim 6, further comprising:
determining whether or not the voltage of the rechargeable battery is at or below a predetermined voltage; and
determining whether the control signal is at a first signal level or a second signal level,
wherein the shutdown signal is controlled to cause each of the detection circuit and the regulator to stop operating in response to determining that the voltage of the rechargeable battery is at or below the predetermined voltage and that the control signal is at the first signal level.

8. The method as claimed in claim 7, wherein the shutdown signal is controlled to cause each of the detection circuit and the regulator to perform the normal operation in response to determining that the control signal is at the second signal level, irrespective of the voltage of the rechargeable battery.

* * * * *